United States Patent
Nuding et al.

(10) Patent No.: US 7,263,821 B2
(45) Date of Patent: Sep. 4, 2007

(54) CHAIN LOCK

(75) Inventors: Andreas Nuding, Geislingen (DE); Werner Lang, Westhausen-Lippach (DE); Hans Dalferth, Aalen-Wasseralfingen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 13 days.

(21) Appl. No.: 10/554,564

(22) PCT Filed: Apr. 28, 2004

(86) PCT No.: PCT/DE2004/000921
§ 371 (c)(1),
(2), (4) Date: Oct. 25, 2005

(87) PCT Pub. No.: WO2004/097252
PCT Pub. Date: Nov. 11, 2004

(65) Prior Publication Data
US 2006/0230741 A1    Oct. 19, 2006

(30) Foreign Application Priority Data
May 2, 2003 (DE) .................... 103 20 692

(51) Int. Cl.
 *F16G 15/02* (2006.01)
 *F16G 15/04* (2006.01)
(52) U.S. Cl. ............................. 59/85; 59/84

(58) Field of Classification Search ............ 59/85, 59/87, 93
See application file for complete search history.

(56) References Cited

U.S. PATENT DOCUMENTS

| 4,090,357 A | * | 5/1978 | Smith ............... 59/85 |
| 6,021,634 A | * | 2/2000 | Brodziak ............ 59/85 |
| 6,223,517 B1 | * | 5/2001 | Bogdan et al. ....... 59/85 |
| 7,024,849 B2 | * | 4/2006 | Benecke et al. ...... 59/85 |

FOREIGN PATENT DOCUMENTS

| DE | 8320392 | 8/1983 |
| DE | 29811332 | 9/1998 |
| DE | 29821312 | 2/1999 |
| DE | 19914015 | 10/2000 |
| DE | 20304534 | 6/2003 |
| FR | 2333170 | 6/1977 |

* cited by examiner

*Primary Examiner*—David B Jones
(74) *Attorney, Agent, or Firm*—Mark P. Stone

(57) ABSTRACT

A chain lock has two lock parts which can be displaced in the longitudinal direction of the lock in order to open and close the lock. Each lock part has a journal (6) which is arranged on one end and a pocket (7) which is arranged on the other end in order to receive a journal (6) of the other lock part. Each journal (6) is fitted with at least one retaining web (8) which can be displaced in a retaining groove (11) of the pocket (7) of the other lock part. The journal (6) and the pocket (7) have a cross-section which continuously widens or expands in the longitudinal direction of the lock.

20 Claims, 2 Drawing Sheets

CHAIN LOCK

TECHNICAL FIELD

The invention relates to a chain lock for link chains having two lock parts which can be displaced by limited amounts with respect to each other in the longitudinal direction of the lock in order to open and close the lock and in each case have two ends which are connected to each other via a longitudinal web and of which in each case one forms a stud having a retaining web extending over part of the circumference of the stud and in each case one is provided with a recess serving to receive the stud and having a retaining groove for the retaining web.

PRIOR ART

A chain lock of the above type is disclosed in DE 23 54 028 C3. The retaining webs of its studs, in the same manner as the retaining grooves of their recesses, have parallel side walls over a large part of their length. The same also applies to the retaining webs and retaining grooves of the studs and recesses of another chain lock disclosed in DE 298 21 312 U1, in which the stud and the recess have end parts which widen or expand increasingly in the transverse direction toward the interior of the bow. In the case of both known constructions, during the installation and removal of the lock, the identically designed lock parts have to be displaced with respect to each other in the direction of the longitudinal axis of the lock by amounts which correspond to the length of the parallel side wall sections and which, on account of their size, make the opening and closing of the lock more difficult. A shortening of the distance of longitudinal displacement is achieved in the case of a chain lock disclosed in DE 199 14 015 C2 by the fact that the retaining webs and the retaining grooves are provided in the region of their parallel side wall sections with intermediate spaces and cutouts which permit the lock parts to be joined together in a partially overlapping intermediate position by means of a movement directed perpendicularly to the longitudinal axis of the lock in order to subsequently join them together along a relatively short distance of displacement in the direction of the longitudinal axis of the lock. The known chain lock which is described last has retaining webs and retaining grooves with parallel side wall sections which—as experience has shown—then, like the previously described constructions, cause problems if the chain lock is to be opened after a relatively long period of use. This is because dirt and frictional corrosion between the studs and recesses which mesh together in a manner virtually free from play regularly lead to a type of adhesive connection between the studs and recesses, the strength of which is primarily determined by the size of the opposite, parallel side wall sections.

SUMMARY OF THE INVENTION

The invention is based on the object of providing a chain lock of the type under consideration, in which not only are the distances of displacement of the lock parts that are required for opening and closing the lock comparatively short, as in the case of the chain lock according to DE 199 14 015 C2, but, in addition, can be opened more easily than known, relevant chain locks, even after relatively long periods of use. The above object is achieved according to the invention in a surprisingly simple manner by the fact that the stud and the recess have a cross section which widens or expands continuously in the longitudinal direction of the lock toward the interior of the lock.

Tests have revealed that chain locks designed within the context of the invention can regularly be opened, even after long-term use, by means of a short blow of a hammer exerted on one of the lock parts after any securing elements which are present have been previously removed, the advantage indicated coming to fruition in particular if the stud has a plurality of retaining webs and the recess has a plurality of retaining grooves.

Further features and details of the invention emerge from the subclaims and the description below of a preferred embodiment which is illustrated in the accompanying drawings.

WAYS OF IMPLEMENTING THE INVENTION

Figure 1:
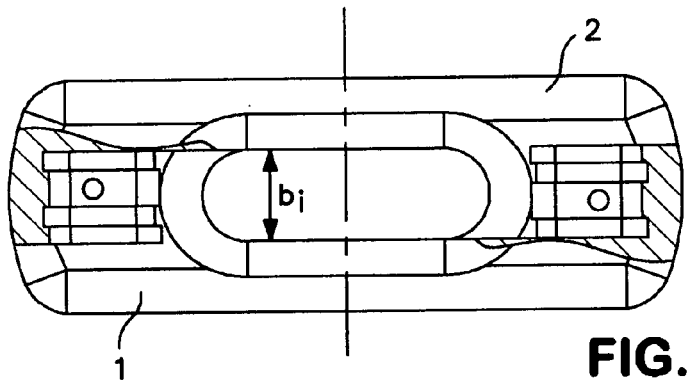
FIG. 1 shows, partially in section, the side view of a chain lock comprising two identical lock parts
Figure 2:
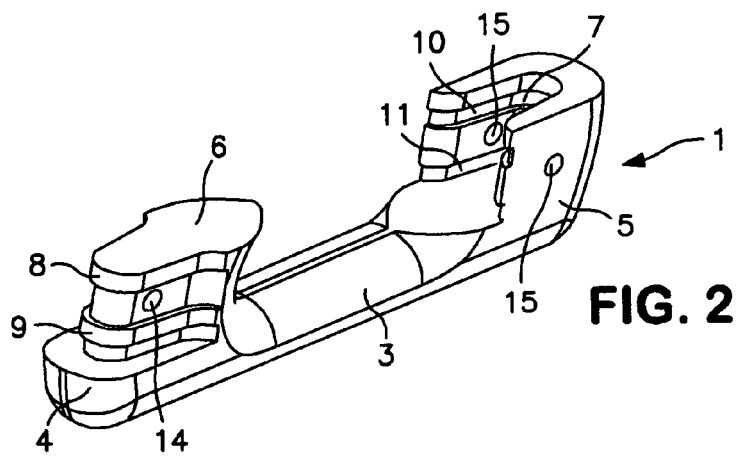
FIG. 2 shows the perspective illustration of an individual lock part
Figure 3:
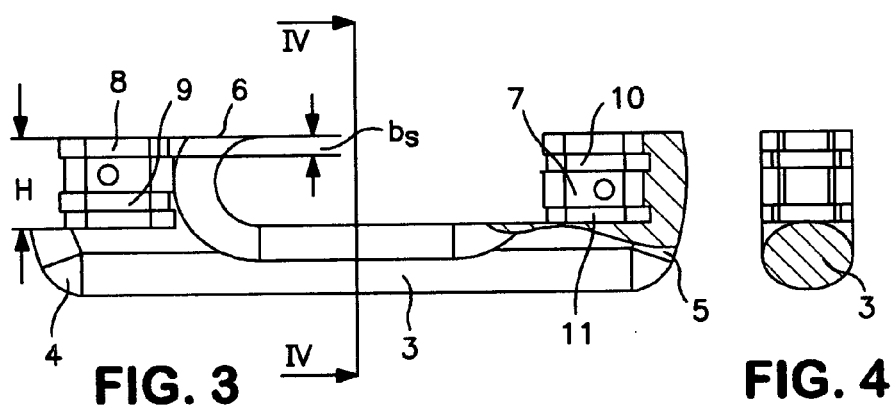
FIG. 3 shows a side view of the lock part according to FIG. 2
Figure 4:
FIG. 4 shows a section along the line IV-IV in FIG. 3
Figure 5:
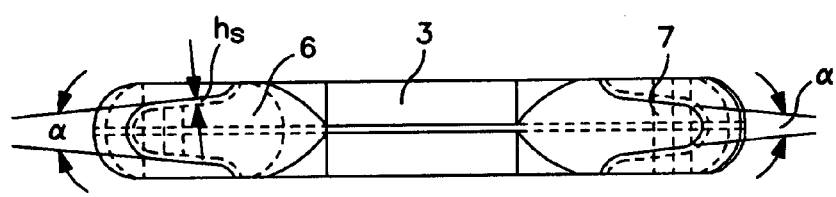
FIG. 5 shows the plan view of the lock part according to FIGS. 2 and 3

FIG. 1 shows a chain lock, which comprises two identically designed lock parts 1 and 2, in the closed state. Details of the construction of the lock parts 1 and 2 emerge from FIGS. 2 to 5.

Each lock part has two ends 4 and 5 which are connected to each other via a longitudinal limb 3 and of which one is provided with a stud 6 and one is provided with a recess 7 serving to receive the stud 6 of the respective other lock part. The stud 6 and the recess 7 have a height H which is essentially identical to the inner width bi of the chain lock. Two retaining webs 8 and 9 provided on the stud 6 are assigned two retaining grooves 10 and 11 provided on the recess 7. As can be best be seen from FIG. 5, both the studs 6 and the recess 7 have a cross section which widens or expands in the longitudinal direction of the chain lock toward the interior of the lock, i.e. neither the flanks of the retaining webs 8, 9 nor those side wall sections of the retaining grooves 10, 11 which are assigned to them run parallel to one another. In the case of the embodiment illustrated in the figures, the flanks of the retaining webs 8, 9 are of wedge-shaped design, i.e. rectilinear design, and those side wall sections of the retaining grooves 10, 11 which are assigned to them form beveled surfaces matched to the wedge angle $\alpha$. The angle $\alpha$ is to be of the order of magnitude of 10 to 30°; in the embodiment illustrated, it is approximately 15°.

Figure 6:
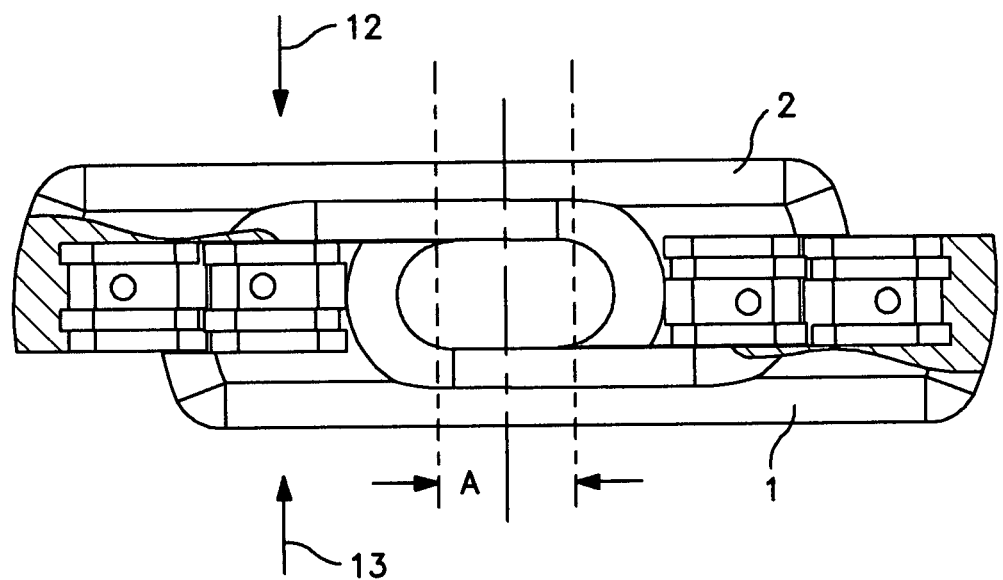
FIG. 6 shows a first side view of the lock parts to be connected.
Figure 7:
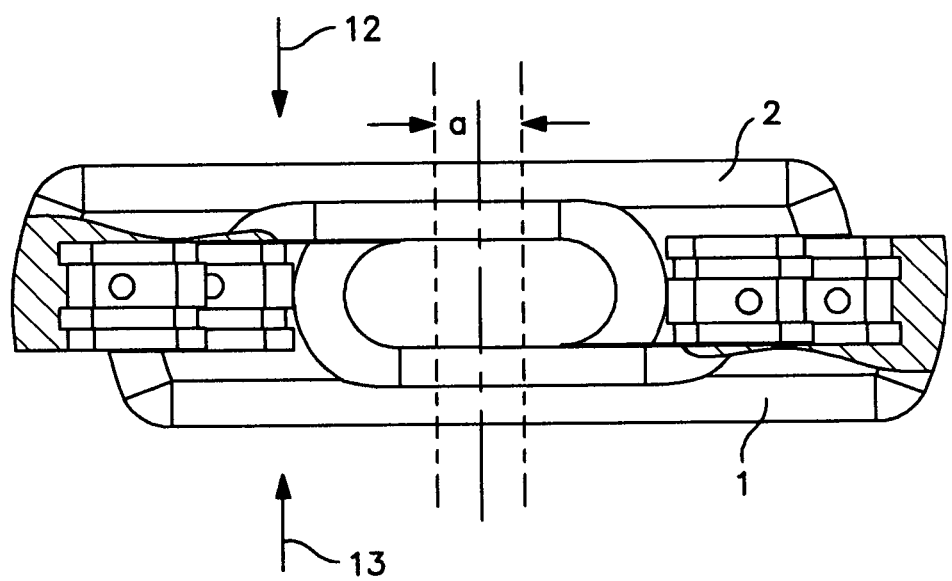
FIG. 7 shows a second side view of the lock parts to be connected.

As can be seen with reference to a comparison of FIGS. 6 and 7, the size of the angle $\alpha$ determines the minimum distance of displacement of the lock parts 1 and 2 in the direction of the longitudinal axis of the chain lock. FIG. 6 illustrates the distance A by which the lock parts 1 and 2, after they have been joined together in the direction of the arrows 12 and 13, would have to be displaced in the direction of the longitudinal axis of the lock if the flanks of the retaining webs 8, 9 and the side wall sections of the retaining grooves 10, 11 were to run parallel to one another. FIG. 7 shows that the distance of longitudinal displacement can be shortened to a value a because of the wedge-shaped design of the flanks of the retaining webs 8, 9 and the bevel of the side wall sections of the retaining grooves 10, 11, the shortening facilitating both the installation and the removal. If the particular circumstances also permit easy installation and removal of the lock when long distances of displacement of the lock parts in the longitudinal direction are used, i.e. it matters only that the lock can be easily opened after long periods of use and severe stressing, the angle α may also assume values smaller than 10°.

In conjunction with the easy releasability of the lock parts 1 and 2 from each other, in addition to the width $b_s$ of the retaining webs 8, 9 that is decisive for the strength, their height $h_s$ is also of importance. It should as far as possible neither drop below nor exceed values of 3 to 6 mm.

14 and 15 are transverse holes for receiving cylindrical securing elements, which also serve for force transmission.

The invention claimed is:

1. A chain lock for link chains with two lock parts (1, 2) which can be displaced by limited amounts with respect to each other in a longitudinal direction of the lock in order to open and close the lock, each lock part having opposed ends which are connected to each other via a longitudinal web (3), one of said opposed ends forming a stud (6) having a retaining web (8) extending over part of a circumference of the stud, and the other of said opposed ends being provided with a recess (7) for receiving the stud and having a retaining groove (10) for the retaining web (8), characterized in that the stud (6) and the recess (7) have a cross section which continuously widens or expands in the longitudinal direction of the lock.

2. The chain lock as claimed in claim 1, characterized in that the retaining webs (8, 9) have wedgeshaped flanks, and that side wall sections of the retaining grooves (10, 11) which face the flanks of the retaining webs (8, 9) have a bevel corresponding to a wedge angle (α) defined between the flanks of the retaining webs.

3. The chain lock as claimed in claim 2, characterized in that the flanks of the retaining webs (8, 9) of the stud (6) and the side wall sections of the retaining grooves (10, 11) of the recess (7) enclose an angle (α) of 10 to 30° between them.

4. The chain lock as claimed in claim 1, characterized in that the retaining webs (8, 9) have a height ($h_s$) which is smaller than their width ($b_s$).

5. The chain lock as claimed in claim 4, characterized in that the height ($h_s$) of the retaining webs (8, 9) is at least 3 mm.

6. The chain lock as claimed in claim 4, characterized in that the height ($h_s$) of the retaining webs (8, 9) is at maximum 6 mm.

7. The chain lock as claimed in claim 1, characterized in that the stud (6) and the recess (7) have a height which is essentially identical to an inner width ($b_1$) of the lock, and in that the stud (6) has a plurality of said retaining webs (8, 9) and the recess (7) has a plurality of said retaining grooves (10, 11).

8. The chain lock as claimed in claim 7, characterized in that the stud (6) has two retaining webs (8, 9) and the recess (7) has two retaining grooves (10, 11).

9. The chain lock as claimed in claim 7, characterized in that the stud (6) and the recess (7) are provided with transverse holes (14, 15) serving to receive a securing element, which can also be used for transmission of force.

10. The chain lock as claimed in claim 2, characterized in that the retaining webs (8, 9) have a height ($h_s$) which is smaller than their width ($b_s$).

11. The chain lock as claimed in claim 3, characterized in that the retaining webs (8, 9) have a height ($h_s$) which is smaller than their width ($b_s$).

12. The chain lock as claimed in claim 10, characterized in that the height ($h_s$) of the retaining webs (8, 9) is at least 3 mm.

13. The chain lock as claimed in claim 11, characterized in that the height ($h_s$) of the retaining webs (8, 9) is at least 3 mm.

14. The chain lock as claimed in claim 10, characterized in that the height ($h_s$) of the retaining webs (8, 9) is at maximum 6 mm.

15. The chain lock as claimed in claim 2, characterized in that the stud (6) and the recess (7) have a height (H) which is essentially identical to an inner width ($b_1$) of the lock, and in that the stud (6) has a plurality of said retaining webs (8, 9) and the recess (7) has a plurality of said retaining grooves (10, 11).

16. The chain lock as claimed in claim 3, characterized in that the stud (6) and the recess (7) have a height (H) which is essentially identical to an inner width ($b_1$) of the lock, and in that the stud (6) has a plurality of said retaining webs (8, 9) and the recess (7) has a plurality of said retaining grooves (10, 11).

17. The chain lock as claimed in claim 4, characterized in that the stud (6) and the recess (7) have a height (H) which is essentially identical to an inner width ($b_1$) of the lock, and in that the stud (6) has a plurality of said retaining webs (8, 9) and the recess (7) has a plurality of said retaining grooves (10, 11).

18. The chain lock as claimed in claim 5, characterized in that the stud (6) and the recess (7) have a height (H) which is essentially identical to an inner width ($b_1$) of the lock, and in that the stud (6) has a plurality of said retaining webs (8, 9) and the recess (7) has a plurality of said retaining grooves (10, 11).

19. The chain lock as claimed in claim 6, characterized in that the stud (6) and the recess (7) have a height (H) which is essentially identical to an inner width ($b_1$) of the lock, and in that the stud (6) has a plurality of said retaining webs (8, 9) and the recess (7) has a plurality of said retaining grooves (10, 11).

20. The chain lock as claimed in claim 8, characterized in that the stud (6) and the recess (7) are provided with transverse holes (14, 15) serving to receive a securing element, which can also be used for transmission of force.

* * * * *